United States Patent
Suzuki (10) Patent No.: US 7,480,788 B2
(45) Date of Patent: Jan. 20, 2009

(54) COMMAND TIME-OUT MANAGING APPARATUS

(75) Inventor: Kenichiro Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 213 days.

(21) Appl. No.: 11/157,428

(22) Filed: Jun. 21, 2005

(65) Prior Publication Data
US 2006/0221781 A1      Oct. 5, 2006

(30) Foreign Application Priority Data
Mar. 31, 2005    (JP) ............................. 2005-102947

(51) Int. Cl.
*G06F 9/00* (2006.01)
(52) U.S. Cl. ..................................... 712/225
(58) Field of Classification Search ............... 712/225; 370/229
See application file for complete search history.

(56) References Cited

U.S. PATENT DOCUMENTS

| | | | |
|---|---|---|---|
| 5,737,573 A * | 4/1998 | Funaki et al. | 711/159 |
| 5,859,835 A * | 1/1999 | Varma et al. | 370/229 |
| 6,061,805 A * | 5/2000 | Suzuki et al. | 714/2 |
| 6,735,140 B1 * | 5/2004 | Fiscus et al. | 365/222 |
| 6,963,430 B2 * | 11/2005 | Matsui | 358/486 |
| 7,013,336 B1 * | 3/2006 | King | 709/224 |

FOREIGN PATENT DOCUMENTS

JP        6-286271        10/1994

OTHER PUBLICATIONS

Yokotani, Tetsuya and Ichihashi, Tatsuki. "A Proposal of Flow Control Mechanism for Multicast ABR and its Performance". IEEE © 1996. pp. 182-190.*

* cited by examiner

Primary Examiner—Aimee J Li
(74) Attorney, Agent, or Firm—Greer, Burns & Crain, LTD.

(57) ABSTRACT

The present information processing apparatus, which receives and executes commands, monitors time-outs of commands with reliability, thereby making it possible to prevent a command initiator from detecting time-outs of the commands. The apparatus includes: a time stamp unit for storing, in a command buffer, a receiving time at which a command receiving unit received a command, in association with the command; and a read-out time-out detecting unit for detecting read-out time-out of a first buffered command in the command buffer, based on the receiving time of the first buffered command. If the read-out time-out detecting unit detects a read-out time-out, the command executing unit reads the command, for which the read-out time-out is detected, from the command buffer and executes the read-out command.

13 Claims, 4 Drawing Sheets

COMMAND TIME-OUT MANAGING APPARATUS

BACKGROUND OF THE INVENTION

1. Field of the Invention

The present invention relates to an information processing apparatus which receives commands issued by a command initiator (for example, a CPU; Central Processing Unit) and executes the received commands.

2. Description of the Related Art

There are conventional information processing apparatuses (hereinafter will be called the first information processing apparatus) including a receiving unit, which receives commands issued by a command initiator (for example, a CPU), and an executing unit, which executes commands which are received by the receiving unit. In this first information processing apparatus, a command received by the receiving unit is directly received by the executing unit, and command execution is controlled so that the command initiator does not detect a time-out of a command, by recording a receiving time at which the command is received.

However, in the first information processing apparatus, if the receiving unit receives a command while the executing unit is executing another command, the executing unit temporarily halts the current command execution to receive the newly received command received by the receiving unit. Thus, if the receiving unit receives commands consecutively, it becomes difficult for the executing unit to complete the command processing currently being executed, and as a result, a time-out of the subject command which is under execution can be detected.

In particular, even when the subject command which is being executed by the executing unit is a command to be executed with higher priority than other commands, the executing unit must spend time in receiving other commands which need not be executed immediately. In this manner, halting the processing of the subject command which is to be executed with priority seriously impedes performance of a system which is limited in processing time.

Therefore, there have been developed information processing apparatuses (hereinafter will be called the second information processing apparatus) having a buffer of a First In First Out (FIFO) type interposed between the receiving unit and the executing unit, which buffer temporarily stores therein commands received by the receiving unit. The executing unit takes out (reads/reads out) the buffered commands with timing which does not affect command execution performed by the executing unit.

The following patent document 1 discloses an art of buffering commands in a FIFO-type buffer.

However, in the second information processing apparatus, since it is impossible to measure a time during which commands are temporarily stored in the buffer, monitoring of command time-out cannot be accurately performed.

That is, since the time during which commands are stored in the buffer cannot be measured, the following events can happen. As the time-out of a command taken out of the buffer by the executing unit is so close that the executing unit cannot afford the time to process the command, a time-out is detected. In addition, with a command being stored in the buffer (that is, before the executing unit takes out the command), a time-out can also be detected.

Further, in the second information processing apparatus, commands received by the receiving unit are temporarily stored in the buffer. Thus, if a command which is to be executed with higher priority than the other commands is received, the priority command is still temporarily stored in the buffer. As a result, the executing unit cannot recognize the issuance of the priority command until the command is taken out of the buffer.

Accordingly, in the second information processing apparatus, a priority command, which is to be executed with higher priority than the other commands, will not be executed until the executing unit takes out the priority command. In consequence, the apparatus is disadvantaged in that it cannot properly cope with commands to be executed with higher priority than other commands.

[Patent Document 1] Japanese Patent Application Laid-Open NO. HEI 6-286271

SUMMARY OF THE INVENTION

With the foregoing problems in view, it is an object of the present invention to provide an information processing apparatus which receives commands issued by a command initiator and executes the commands, making it possible to reliably monitor time-outs of received commands, and to prevent detection of time-outs by the command initiator.

In order to accomplish the above object, according to the present invention, there is provided an information processing apparatus, comprising: a command receiving unit for receiving a command; a command buffer of a First-In First-Out type for temporarily storing therein the command received by the command receiving unit; a time stamp unit for storing, in the command buffer, a receiving time at which the command receiving unit received the command, in association with the command; a command executing unit for reading the command stored in the command buffer and executing the read-out command; and a read-out time-out detecting unit for detecting read-out time-out of a first buffered command in the command buffer, based on the receiving time of the first buffered command. The command executing unit, if the read-out time-out detecting unit detects a read-out time-out of the command, reads the command, for which the read-out time-out is detected, from the command buffer and executes the read-out command.

As one preferred feature, the read-out time-out detecting unit includes: a calculating unit for calculating read-out time-out of the first buffered command in the command buffer, based on the receiving time of the first buffered command; a holding unit for holding the read-out time-out time calculated by the calculating unit; a comparing unit for comparing the read-out time-out time held in the holding unit with the current time; and a notifying unit, if it is found that the read-out time-out time has come as a result of comparison by the comparing unit, for deciding that the read-out time-out of the command is detected and notifying the command executing unit to that effect.

As another preferred feature, the calculating unit calculates the read-out time-out time so that the read-out time-out time of the command is earlier than an actual time-out time which is managed by an initiator of the command.

As yet another preferred feature, the information processing apparatus further comprises a command judging unit for evaluating whether or not the command received by the command receiving unit is a priority command which is to be executed with priority, based on command property information included in the command. The command executing unit, if the command judging unit evaluates that the command received by the command receiving unit is a priority command, reads out the priority command and executes the read-out priority command with priority.

As a further preferred feature, the information processing apparatus further comprises a counter which on one hand increments by 1 every time a priority command, which has been evaluated to be a priority command by the command judging unit, is stored in the command buffer, and which on the other hand decrements by 1 every time a priority command is read from the command buffer. The command executing unit continues reading out a priority command, which has been evaluated to be so by the command judging unit, until the counter exhibits a value of "0".

In this manner, according to the present invention, when a read-out time-out detection unit detects a read-out time-out based on the receiving time of a command, a command execution unit reads, from the command buffer, the command whose read-out time-out has been detected, and executes the read-out command. Therefore, it is possible to prevent the command initiator from detecting a time-out while monitoring of time-outs of received commands is being performed with reliability.

Other objects and further features of the present invention will be apparent from the following detailed description when read in conjunction with the accompanying drawings.

DESCRIPTION OF THE PREFERRED EMBODIMENT(S)

One preferred embodiment of the present invention will now be described with reference to the accompanying drawings.

[1] Description of One Embodiment

Figure 1:
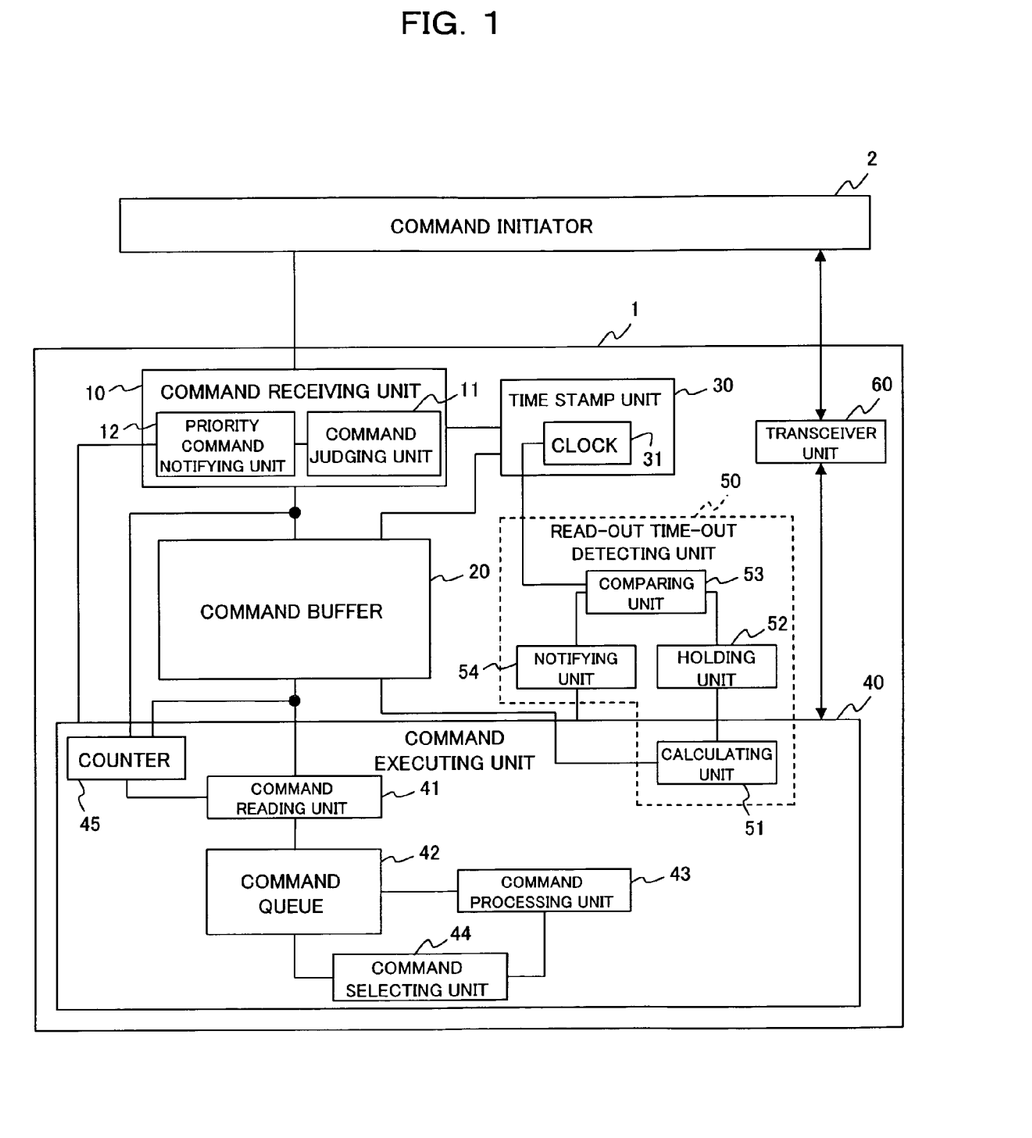
FIG. 1 is a block diagram showing an information processing apparatus according to one preferred embodiment of the present invention.

Referring to the block diagram of FIG. 1, a description will be made hereinbelow of an information processing apparatus according to one preferred embodiment of the present invention. As shown in FIG. 1, the information processing apparatus 1 includes a command receiving unit 10, a command buffer 20, a time stamp unit 30, a command executing unit 40, a read-out time-out detecting unit 50, and a transceiver unit 60.

A command receiving unit 10, which includes a command judging unit 11 and a priority command notifying unit 12, receives commands issued from command initiators (for example, one or plural CPUs; Central Processing Units) 2, and stores the received commands in the command buffer 20.

The command judging unit 11 evaluates whether or not commands which have been received by the command receiving unit 10 are commands (priority commands) to be executed with higher priority than other commands, based on command property information included in the commands.

Here, such commands received by the command receiving unit 10 include three types of command information: (1) command initiator information (Init ID; Initiator Identification); (2) command property information; (3) command contents.

First of all, (1) command initiator information is information indicating the initiator of a command.

Next, (2) command property information indicates property of a command, showing, for example, any one of the following: (a) Head Of Queue; (b) Ordered; (c) Simple.

The command property information of (a) Head Of Queue, indicates that the subject command is a command (hereinafter will be called a "priority command") to be executed more preferentially than others.

Further, the command property information of (b) Ordered indicates that the subject command is a command whose execution order should not be changed.

Furthermore, the command property information of (c) Simple indicates that the subject command is a command whose execution order can be changed.

The command contents are process contents (read/write) of commands.

Accordingly, if (2) command property information included in a command received by the command receiving unit 10 is (a) Head OF Queue, the command judging unit 11 judges that the subject command is a priority command.

When the command judging unit 11 judges that the command received by the command receiving unit 10 is a priority command, the priority command notifying unit 12 notifies the command executing unit 40 that the command receiving unit 10 has received a priority command.

The command buffer 20 is a memory unit of a FIFO (First In First Out) type, and temporarily stores therein commands received by the command receiving unit 10.

The time stamp unit 30 stores receiving times at which the command receiving unit 10 received commands, in the command buffer 20 in association with the corresponding commands, and has a clock 31 which presents the current time.

Accordingly, the command buffer 20 stores therein the following command information for each command: (1) command initiator information; (2) command property information; (3) command contents; (4) a command receiving time.

The command executing unit 40 reads (takes out) commands stored in the command buffer 20 and executes the read-out commands. For that purpose, the command executing unit 40 includes a command reading unit 41, a command queue 42, a command processing unit 43, a command selecting unit 44, a counter 45, and a calculating unit 51. Here, as the calculating unit 51 functions as a read-out time-out detecting unit, its detailed description will be given later, in a description section of the read-out time-out detecting unit 50.

The command reading unit 41 reads commands from the command buffer 20, and the reading is performed with timing which will not affect command execution processing performed by the command processing unit 43.

The command queue 42 holds commands read out by the command reading unit 41.

The command processing unit 43 takes out commands held in the command queue 42 and executes those commands taken out.

From all of the commands held in the command queue 42, the command selecting unit 44 selects commands which are to be executed with priority, based on command information included in such commands. That is, while the command processing unit is executing some command, the command selecting unit 44 selects a command which is to be executed next by the command processing unit 43.

For example, if the command queue 42 holds a priority command, the command selecting unit 44 selects the priority command.

Accordingly, if the command selecting unit 44 selects a command, the command processing unit 43 preferentially takes out the command from the command queue 42 to execute the taken out command.

In addition, the command selecting unit 44 selects a command whose time-out is most likely to be detected by the command initiator 2, based on the receiving time or the read-out time-out time (will be detailed later) of the command.

Further, on the basis of command contents and command property information, the command selecting unit 44 selects commands so as to efficiently execute commands, within a range in which time-outs (read-out time-outs or time-outs managed by the command initiator 2) of the commands will not be detected. For example, if two or more commands for accessing the same disk are held in the command queue 42, the command selecting unit 44 selects commands so that these commands are executed consecutively.

The counter 45 counts the number of priority commands stored in the command buffer 20. The counter 45 increments by 1 when one command which has been evaluated to be a priority command by the command judging unit 11 is stored in the command buffer 20, and on the other hand, it decrements by 1 when one priority command is read out from the command buffer 20 by the command reading unit 41.

Here, a description will be made hereinbelow of an operation of the command executing unit 40 when it is notified by the priority command notifying unit 12 that the command receiving unit 10 has received a priority command. When the priority command notifying unit 12 notifies the command executing unit 40 that the command receiving unit 10 has received a priority command, the command reading unit 41 immediately reads the priority command from the command buffer 20 with a timing which will not affect command execution processing of the command processing unit 43. At this time, on the basis of the counter 45, the command reading unit 41 reads out the priority command by continuing reading commands until the counter 45 exhibits a value of "0".

The priority command read out by the command reading unit 41 is held in the command queue 42, and the command selecting unit 44 selects the priority command, whereby the command processing unit 43 preferentially executes the processing of the priority command.

As shown in FIG. 1, on the basis of the receiving time of the first buffered command (that is, the oldest command) in the command buffer 20, the read-out time-out detecting unit 50, which includes a calculating unit 51, a holding unit 52, a comparing unit 53, and a notifying unit 54, detects the time-out of this command.

Here, the read-out time-out, differing from the command time-out which is managed by the command initiator 2, is the time-out for reading of commands from the command buffer 20, the time-out being set so as to prevent the command initiator 2 from detecting a time-out.

That is, the read-out time-out is set in a range such that the command initiator 2 will not detect a time-out of a command if the command reading unit 41 reads the command from the command buffer 20 and the command processing unit 43 executes the processing of the command. Accordingly, the read-out time-out detecting unit 50 detects a read-out time-out earlier than the command initiator 2 does.

Figure 4:
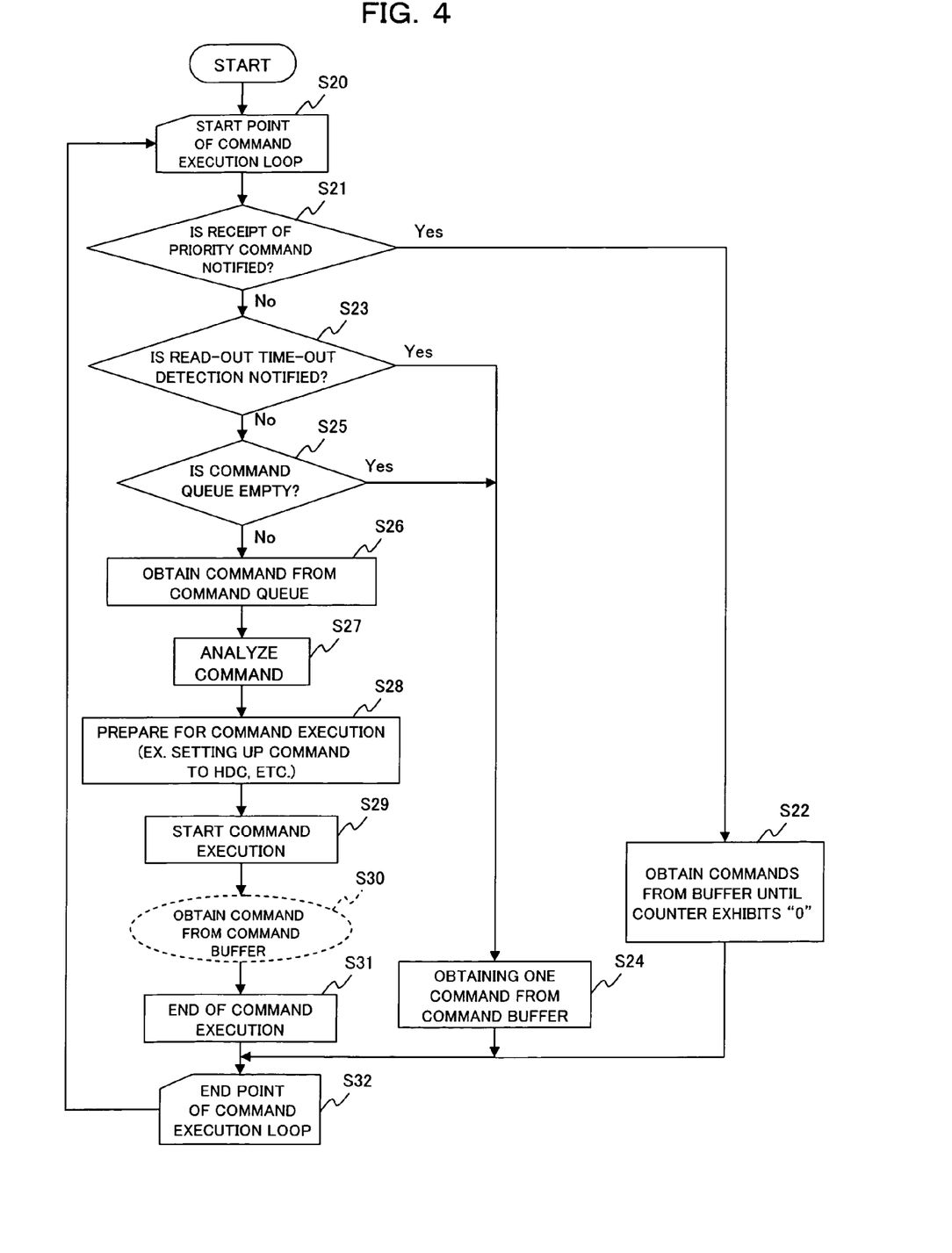
FIG. 4 is a flowchart for describing procedures performed by a command executing unit of the information processing apparatus of the present embodiment.

Therefore, as shown in FIG. 4, according to the information processing apparatus 1, even if the read-out time-out detecting unit 50 detects a read-out time-out of a command, the command reading unit 41 reads out the command and stores the command in the command queue 42, and then the command selecting unit 44 selects the command to execute the processing of the command with priority. Thus, it is possible to complete the command processing before the command initiator 2 detects a time-out of the command.

On the basis of the receiving time of a first buffered command in the command buffer 20 and its command contents, which are command information of the command, the calculating unit 51 calculates a read-out time-out time of the command.

More specifically, based on the command contents of a command which is first buffered in the command buffer 20, the calculating unit 51 evaluates the type of subject command, that is, whether the subject command is a read command or a write command. The calculating unit 51 then calculates a read-out time-out time of the command so that the calculated time-out time is earlier than an actual time-out time of the command which is managed by the command initiator 2, by adding a time set beforehand for each type of command to the receiving time of the command.

That is, in comparison with a time-out time for each type of command which is managed by the command initiator 2, a command-type-dependent time added by the calculating unit 51, for calculating a read-out time-out time, to a receiving time of a command is shorter by a time necessary for the command reading unit 41 to read the command and for the command processing unit 43 to perform processing of the command. As a result, detection of a read-out time-out by the read-out time-out detecting unit 50 is capable of preventing detection of a time-out by the command initiator 2.

Every time the command reading unit 41 of the command executing unit 40 reads a command from the command buffer 20, the calculating unit 51 calculates a read-out time-out time, and stores the calculated read-out time-out time in the holding unit 52 to update the read-out time-out stored therein.

The comparing unit 53 compares the read-out time-out time stored in the holding unit 52 with the current time. Here, using the clock 31 of the time stamp unit 30, a read-out time-out time is compared with the current time.

As a result of comparison by the comparing unit 53, if the current time is equal to the read-out time-out time held in the holding unit 52, the notifying unit 54 judges that the read-out time-out of the subject command is detected, and notifies the command executing unit 40 to that effect.

As for an operation of the command executing unit 40 upon notification of detection of a read-out time-out by the notifying unit 54, its description will be made later, referring to FIG. 4.

The transceiver unit 60 sends and receives information between the command initiator 2 and the command executing unit 40. For example, if command initiator 2 detects a time-out, such a time-out is notified to the command executing unit 40 via the transceiver unit 60. In addition, the result of command execution processing by the command processing unit 43 is also sent from the command executing unit 40 to the command initiator 2 via the transceiver unit 60.

Figure 2:
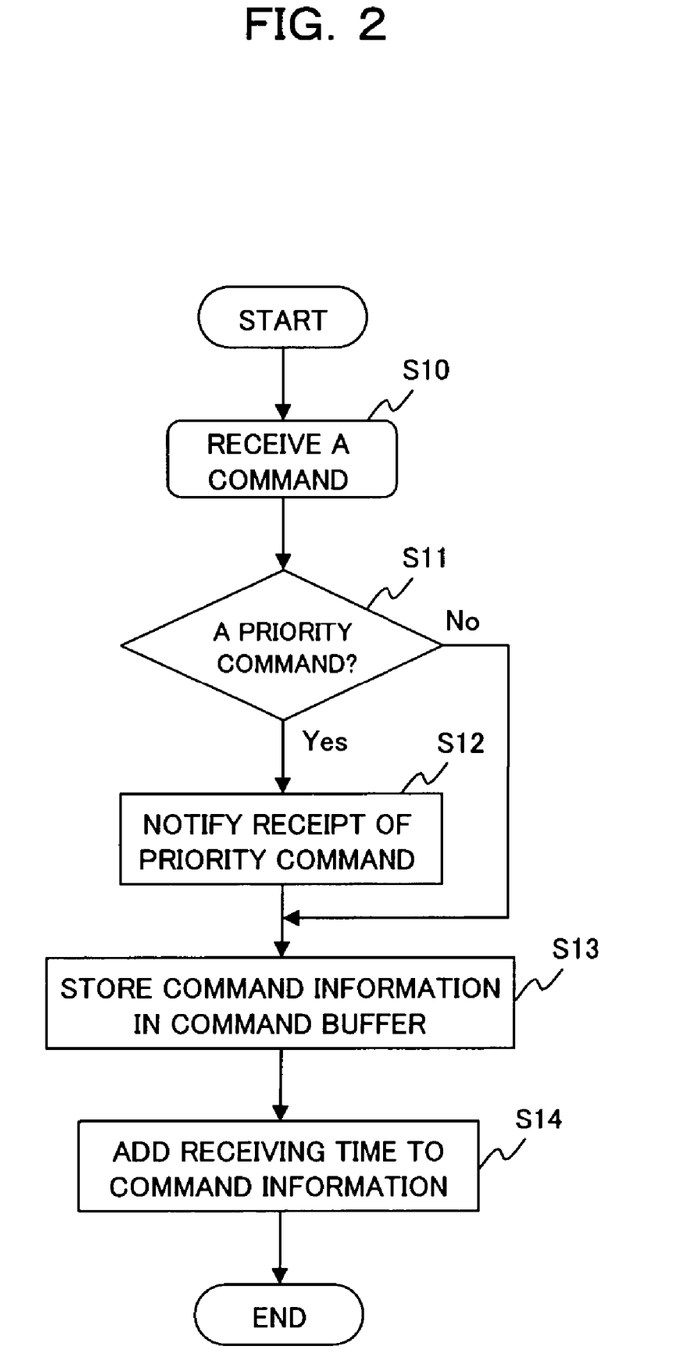
FIG. 2 is a flowchart for describing command receipt procedures performed by a command receiving unit of the information processing apparatus of the present embodiment.

Next, referring to the flowchart (step S10 through step S14) of FIG. 2, an operation performed from when a command is received from the information processing apparatus 1 until when the command is stored in the command buffer 20 will be described hereinbelow.

In the beginning, when the command receiving unit 10 receives a command issued by the command initiator 2 (step S10), the command judging unit 11 evaluates whether or not the subject command is a priority command, based on the command property information of the command (step S11).

Here, if the command judging unit 11 judges that the subject command is a priority command (Yes route of step S11), the priority command notifying unit 12 notifies the command executing unit 40 of the receipt of the priority command (step S12), and the command receiving unit 10 stores the subject command (command information) in the command buffer 20 (step S13).

On the other hand, if the command judging unit 11 judges that the subject command is not a priority command (No route of step S11), the above step S12 is skipped, and the command receiving unit 10 stores the command in the command buffer 20 (step S13).

The time stamp unit 30 then stores a receiving time of the command in association with command information of the subject command stored in the command buffer 20 (the receiving time is added to the command information of the command; step S14), and the processing ends.

Figure 3:
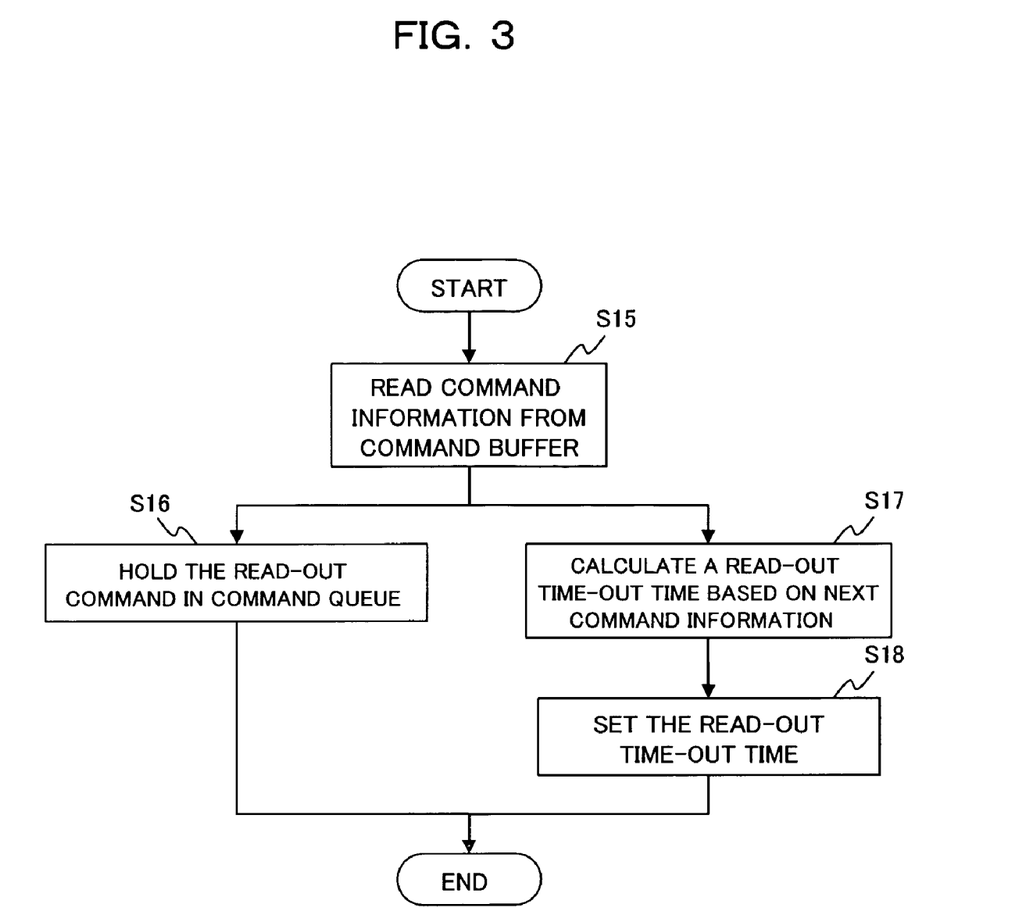
FIG. 3 is a flowchart for describing procedures performed at the time of reading a command from a command buffer of the information processing apparatus of the present embodiment.

Next, referring to the flowchart (step S15 through step S18) of FIG. 3, a description will be made herein below of an operation performed when a command is read from the command buffer 20 of the information processing apparatus 1. First of all, the command reading unit 41 reads a command from the command buffer 20 with timing which does not affect command processing that is being executed by the command processing unit 43 (step S15).

The command queue 42 holds the command read out of the command buffer 20 by the command reading unit 41 (step S16).

At the same time, on the basis of a command which has been put into the command buffer 20 subsequent to the command read out of the command buffer 20 (that is, an oldest command in the command buffer 20), the calculating unit 51 of the read-out time-out detecting unit 50 calculates a read-out time-out time of the subsequent command (step S17), and the calculating unit 51 sets (stores and updates) the calculated read-out time-out time in the holding unit 52 (step S18), and then the processing ends.

Referring to the flowchart (step S20 through S32) of FIG. 4, a description will be made hereinbelow of a processing operation performed by the command executing unit 40 of the information processing apparatus 1. When a command execution loop is started (step S20), the command executing unit 40 evaluates the presence or absence of a priority command receipt notification sent from the priority command notifying unit 12 (step S21) If such a receipt notification of a priority command from the priority command notifying unit 12 is present (Yes route of step S21), the command reading unit 41 reads commands from the command buffer 20 until the counter 45 exhibits a value of "0", whereby the priority command is read out to be held in the command queue 42 (step S22) Then, the command executing unit 40 returns to the start point of the command execution loop from the end point of the loop (step S32 and step S20).

On the other hand, if there is no notification of receipt of a priority command (No route of step S21) from the priority command notifying unit 12, the command executing unit 40 evaluates the presence or absence of a notification of detection of a read-out time-out, which is notified by the notifying unit 54 of the read-out time-out detecting unit 50 (step S23).

Here, if there is a notification of detection of a read-out time-out from the notifying unit 54 (Yes route of step S23), the command reading unit 41 reads commands from the command buffer 20 one by one, whereby the command whose time-out has been detected is read out and is stored in the command queue 42 (step S24) After that, the command executing unit 40, again, returns from the end point of the command execution loop to the start point of the loop (step S32 and S20).

On the other hand, if there is no notification of detection of a read-out time-out from the notifying unit 54 (No route of step S23), the command executing unit 40 verifies that the command queue 42 actually holds no command, being empty (step S25).

If the command queue 42 is empty (Yes route of step S25), the command reading unit 41 reads one command from the command buffer 20 and stores it in the command queue 42 (step S24).

The command executing unit 40, once again, returns from the end point of the command loop to the start point of the execution loop (step S32 and step S20).

On the other hand, if the command queue 42 is not empty (No route of step S25), the command processing unit 43 obtains a command from the command queue 42 based on command selection by the command selecting unit 44 (step S26).

In this step S26, a priority command obtained in the above step S22 and a command whose read-out time-out is detected in the above step S24, are compared by the command selecting unit 44 with the other commands held in the command queue 42 in priority, and are preferentially selected by the command selecting unit 44 and then preferentially executed by the command processing unit 43.

As a result, it is possible for the command processing unit 43 to immediately process priority commands. Further, as for commands whose read-out time-outs are detected, it is possible to complete processing of the commands before the command initiator 2 detects their time-outs.

Next, the command processing unit 43 analyzes the obtained command (step S27), and prepares for execution of command execution (step S28).

Here, in such a command execution preparation performed by the command processing unit 43, for example, when the subject command is for writing data on a hard disk, or when it is for reading data from a hard disk, the command processing unit 43 sets the command to the controller (HDC: Hard Disk Controller) of an external hard disk.

After that, the command processing unit 43 starts executing command processing (step S29). During the time from this time point to a time point at which the execution of the command processing ends (step S31), a command reading process from the command buffer 20 executed by the command reading unit 41 does not affect the command processing which is being executed by the command processing unit 43. Therefore, the command reading unit 41 reads as many commands as possible one by one from the command buffer 20, and stores the read-out commands in the command queue 42 (step S30).

Then, after the command processing unit 43 finishes the command processing (step S31), the command executing unit 40 again returns from the end point of the command execution loop to the start point of the loop (step S32 and step S20), and the above-described processing, from step S20 through step S31, is repeated.

In the above example, the description was made, referring to FIG. 4, of a case where the command executing unit 40 checks a receipt notification and a read-out time-out detection notification at the start point of the command execution loop (see the above step S21 and step S23). If the command executing unit 40 of the information processing apparatus 1 is notified of receipt of a priority command by the priority command notifying unit 12 while executing processing (that is, the above steps S26 through S30) of a command, the command reading unit 41 executes processing similar to the above step S22 with the timing shown in the above step S30, so as to read the priority command from the command buffer 20 to store the read-out priority command in the command queue 42.

Further, if the command executing unit 40 of the information processing apparatus 1 is notified of detection of a read-out time-out by the notifying unit 54 of the read-out time-out detecting unit 50 while executing processing (that is, the above steps S26 through S30) of a command, the command reading unit 41 executes processing similar to the above step S24 with the timing shown in the above step S30, so as to read, from the command buffer 20, the command whose time-out is detected, to store the read-out priority command in the command queue 42.

In this manner, according to the information processing apparatus 1 of one preferred embodiment of the present invention, the time stamp unit 30 stores a receiving time of a command received by the command receiving unit 10 in the command buffer 20 in association with the command, and the calculating unit 51 of the read-out time-out detecting unit 50 calculates a read-out time-out time of the command based on the receiving time. When the read-out time-out time has come, the notifying unit 54 notifies the command executing unit 40 of detection of the read-out time-out of the command. Further, being notified of the detection of the read-out time-out, the command reading unit 41 reads the command from the command buffer 20 and stores the read-out command in the command queue 42, which command is then selected by the command selecting unit 44, whereby the command processing unit 43 preferentially executes processing of the command without delay. With this arrangement, it is possible to perform time-out monitoring for commands temporarily stored in the command buffer 20 with reliability, so that commands are executed before the command initiator 2 detects their time-outs. It is thus possible to prevent the command initiator 2 from detecting time-outs.

Therefore, in the information processing apparatus 1, error processing need not be performed which is to be executed upon detection of time-outs, whereby stable performance is provided.

For example, assuming that a command issued by the command initiator 2 is a command for using a disk drive (a read or write request), if an execution time of one command executed by the command processing unit 43 is 2ms, it takes 10ms to complete five commands.

However, if the command initiator 2 detects a time-out and then performs error processing, a rotational delay of the disk, for example, is caused. If the number of revolutions is 7200 rpm, rotation delay time per rotation is about 8 ms, whereby the command execution time is extended. Thus, if a time-out is detected and then error processing is performed, five commands need a time of 18 ms, and the command execution time is significantly delayed, thereby deteriorating the performance by 50% or so.

Accordingly, preventing detection of time-out provides stable performance.

Further, according to the information processing apparatus 1, if the command executing unit 40 is notified of receipt of a priority command by the priority command notifying unit 12, the command reading unit 41 immediately reads commands from the command buffer 20 until the counter 45 exhibits a value of "0", with timing which does not affect command processing performed by the command processing unit 43, whereby the priority command is read from the command buffer 20.

As a result, the command reading unit 41 is capable of reliably reading the priority command from the command buffer 20, and when reading the priority command, it is not necessary to read all the commands stored in the command buffer 20. Thus, since unnecessary commands that are put into the command buffer 20 during the time from when the priority command is put in the command buffer 20 until when the command is read out by the command reading unit 41, is not read out (that is, unnecessary commands that are put into the command buffer 20 during the time from when a notification is received from the priority command notifying unit 12 until when the priority command is read from the command buffer 20, is not read out), it is possible to efficiently read the priority command from the command buffer 20, and the priority command can be processed without delay.

In addition, since the priority command, which is read out by the command reading unit 41 and is held in the command queue 42, is selected by the command selecting unit 44 and is executed by the command processing unit 43 with priority, it is possible for the command processing unit 43 to immediately execute processing of the priority command that is issued by the command initiator 2, and thus the priority command can be properly dealt with.

[2] Other Modifications:

Further, the present invention should by no means be limited to the above-illustrated embodiment, but various changes or modifications may be suggested without departing from the gist of the invention.

For example, in the above embodiment, the command executing unit 40 has the counter 45. The present invention should not be limited to this arrangement, and such a counter 45 can be provided for the command receiving unit 10.

Further, the information processing apparatus of the present invention can be constructed without a counter 45. In this case, when a receipt of a priority command is notified to the command executing unit 40 by the priority command notifying unit 12, the command reading unit 41 reads all the commands stored in the command buffer 20, thereby reading out the priority command from the command buffer 20. It is hereby possible to reliably read the priority command stored in the command buffer 20.

Still further, in the above embodiment, the calculating unit 51 of the read-out time-out detecting unit 50 calculates a read-out time-out time. The present invention should not be limited to this, and the calculating unit 51 calculates the remaining time (read-out time-out time) until the read-out time-out is detected, based on a receiving time of a first buffered command, out of the commands stored in the command buffer 20, and on the command type. In this case, the read-out time-out detecting unit 50, instead of the comparing unit 53, has a time-counter unit for counting the above remaining time. When the comparing unit 53 detects the elapse of the remaining time, the notifying unit 54 notifies the command executing unit 40 that the read-out time-out of the command is detected. This arrangement can realize similar effects to those of the above embodiment.

Furthermore, in the above embodiment, the command selecting unit 44 of the command executing unit 40 selects a command to be executed with priority, out of the commands held in the command queue 42. The present invention should not be limited to this, and the command executing unit 40 may appropriately permutate the execution order of the commands held in the command queue 42 (for example, every time a command is newly put into the command queue 42), whereby like effects to those of the above embodiment can be realized.

In addition, if the command initiator 2 detects a time-out for any reason, the command processing unit 43 of the command executing unit 40 may execute error processing of the command, whose time-out has been detected.

In this case, in the information processing apparatus 1, in view of a receiving time added to each of the commands stored in the command buffer 20, the command executing unit 40, after completion of the error processing of a command whose time-out is detected, evaluates whether or not a time-out of the next command is detected by the command initiator 2 based on a receiving time of the next command. If it is judged that its time-out is not detected, the subject command and other commands whose receiving times are later than that of the subject command are processed in a normal way, without being cancelled by error processing. On the other hand, if it is judged that the time-out of the subject command is detected, error processing of the command is executed, and further, similar processing is preferably performed on the next command.

In other words, when the command initiator 2 detects a time-out of a command, the command executing unit 40 preferably evaluates whether or not the command initiator 2 detects a time-out of each of the commands.

In the above-described conventional first and second information processing apparatus, when a time-out error is detected, it is assumed that time-outs of all the commands stored in the command buffer 20 are detected due to error processing for the above error, and thus, all the commands stored in the command buffer 20 are cancelled. In contrast, in the information processing apparatus of the present invention, even when the command initiator 2 detects a time-out of one command, if it is judged that time-outs of the other commands are not detected, canceling of all the commands is not performed, whereby useless time-out error processing can be eliminated.

Here, functions of the above-mentioned command receiving unit 10, command judging unit 11, priority command notifying unit 12, time stamp unit 30, command reading unit 41, command processing unit 43, command selecting unit 44, counter 45, calculating unit 51, holding unit 52, comparing unit 53, notifying unit 54, and transceiver unit 60, can be realized by executing specific application programs by means of a computer (including a CPU, information processing apparatus, and various types of terminals).

Such programs are recorded in computer-readable recording media such as flexible discs, CDs (CD-ROMs, CD-Rs, CD-RWs, and so on), and DVDs (DVD-ROM, DVD-RAM, DVD-R, DVD-RW, DVD+R, DVD+RW, and so on). The computer reads the programs from such recording media to transfer the programs to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a micro processor such as a CPU and a means for reading computer programs from recording media.

The aforementioned predetermined application programs contain program codes that instruct the computer to function as the command receiving unit 10, command judging unit 11, priority command notifying unit 12, time stamp unit 30, command reading unit 41, command processing unit 43, command selecting unit 44, counter 45, calculating unit 51, holding unit 52, comparing unit 53, notifying unit 54, and transceiver unit 60. Further, a part of those functions can be realized by the OS, not by such application programs.

Moreover, as recording media used in the embodiments of the present invention, not only the above-mentioned flexible discs, CDs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs), external storage devices, and printed matter with any codes such as barcodes printed thereon, are applicable.

What is claimed is:

1. A command time-out managing apparatus, comprising:
   a command receiving unit receives a read-out command;
   a command buffer of a first-in first-out type temporarily stores therein the read-out command received by said command receiving unit;
   a time stamp unit stores a receiving time at which said command receiving unit received the read-out command in said command buffer and in association with the read-out command;
   a command executing unit reads the command stored in said command buffer and executes the read-out command; and
   a read-out time-out detecting unit having:
      a calculating unit calculates read-out time-out time of a first buffered command in said command buffer so that the calculated read-out time-out time of the first buffered command is earlier than an actual time-out time of the first buffered command managed by an initiator of the first buffered command, wherein said calculation of the calculated read-out time-out time includes deciding a type of command and adding a time duration, which has been set beforehand for each type of command, to a receiving time of the command,
      a holding unit holds the read-out time-out time calculated by said calculating unit,
      a comparing unit compares the read-out time-out time held in said holding unit with a current time, and
      a notifying unit decides that the read-out time-out time of the read-out command is detected and notifying said command executing unit to that effect, when a result of said comparing unit found that the read-out time-out time has come,
   said command executing unit reads the read-out command for which the read-out time-out time is detected from said command buffer and executing the read-out command, when said read-out time-out detecting unit detects a read-out time-out time of the read-out command.

2. The command time-out managing apparatus as set forth in claim 1, wherein, every time said command executing unit reads out a command from said command buffer, said calculating unit calculates the read-out time-out time and stores the calculated read-out time-out time in said holding unit to update the read-out time-out time held therein.

3. The command time-out managing apparatus as set forth in claim 2, further comprising
   a command judging unit for evaluating, based on command property information included in another command, whether or not the another command received by said command receiving unit is a priority command which is to be executed with priority,
   when said command judging unit evaluates that the another command received by said command receiving unit is a priority command, said command executing unit reads out the another command and executes the another priority command with priority.

4. The command time-out managing apparatus as set forth in claim 3, further comprising
when an evaluated priority command has been evaluated to be a priority command by said command judging unit, a counter increments by 1 every time the evaluated priority command is stored in said command buffer and decrements by 1 every time a priority command is read out from said command buffer, said command executing unit continues reading out the evaluated priority command until said counter exhibits a value of "0".

5. The command time-out managing apparatus as set forth in claim 1, wherein said command executing unit includes:
- a command reading unit reads a command from said command buffer;
- a command queue holds the read-out command read out by said command reading unit;
- a command processing unit removes the read-out command held in said command queue and executes the read-out command; and
- a command selecting unit selects a priority command to be executed with priority, from a plurality of commands held in said command queue, and
wherein said command executing unit preferentially removes the priority command selected by said command selecting unit from said command queue and executes the priority command.

6. The command time-out managing apparatus as set forth in claim 5, further comprising
a command judging unit for evaluating, based on command property information included in another command, whether or not the another command received by said command receiving unit is a priority command which is to be executed with priority,
when said command judging unit evaluates that the command received by said command receiving unit is a priority command, said command executing unit reads out the priority command and executes the another priority command with priority.

7. The command time-out managing apparatus as set forth in claim 6, further comprising
when an evaluated priority command has been evaluated to be a priority command by said command judging unit, a counter increments by 1 every time the evaluated priority command is stored in said command buffer and decrements by 1 every time a priority command is read out from said command buffer,
said command executing unit continues reading out the evaluated priority command until said counter exhibits a value of "0".

8. The command time-out managing apparatus as set forth in claim 1, further comprising
a command judging unit for evaluating, based on command property information included in the read-out command, whether or not the read-out command received by said command receiving unit is a priority command which is to be executed with priority,
when said command judging unit evaluates that the read-out command received by said command receiving unit is a priority command, said command executing unit reads out the read-out command and executes the read-out command with priority.

9. The command time-out managing apparatus as set forth in claim 8, wherein, when the read-out priority command has been evaluated to be a priority command by said command judging unit, said command executing unit reads the read-out priority command by reading out all the commands stored in said command buffer.

10. The command time-out managing apparatus as set forth in claim 8, further comprising
when an evaluated priority command has been evaluated to be a priority command by said command judging unit, a counter increments by 1 every time the evaluated priority command is stored in said command buffer and decrements by 1 every time a priority command is read from said command buffer,
said command executing unit continues reading out the evaluated priority command until said counter exhibits a value of "0".

11. The command time-out managing apparatus as set forth in claim 1, further comprising
a command judging unit for evaluating, based on command property information included in another command, whether or not the another command received by said command receiving unit is a priority command which is to be executed with priority,
when said command judging unit evaluates that the another command received by said command receiving unit is a priority command, said command executing unit reads out the another priority command and executes the another priority command with priority.

12. A command time-out managing apparatus as set forth in claim 11, further comprising
when an evaluated priority command has been evaluated to be a priority command by said command judging unit, a counter increments by 1 every time the evaluated priority command is stored in said command buffer and decrements by 1 every time a priority command is read out from said command buffer,
said command executing unit continues reading out the evaluated priority command until said counter exhibits a value of "0".

13. The command time-out apparatus as set forth in claim 1, wherein deciding the type of command includes determining whether the read-out command is a read command or a write command.

* * * * *